(12) United States Patent
Chang et al.

(10) Patent No.: US 11,524,637 B2
(45) Date of Patent: Dec. 13, 2022

(54) VIBRATION REDUCTION DEVICE HAVING ACOUSTIC META STRUCTURE

(71) Applicants: Hyundai Motor Company, Seoul (KR); Kia Motors Corporation, Seoul (KR); Katholieke Universiteit Leuven of KU Leuven Research & Development, Leuven (BE)

(72) Inventors: Kyoung Jin Chang, Suwon-si (KR); Claus Claeys, Leuven (BE); Wim Desmet, Sint-Joris-Weert (BE); Bert Pluymers, Geetbets (BE); Elke Deckers, Hechtel-Eksel (BE); Lucas Van Belle, Heverlee (BE); Noé Geraldo Rocha De Melo Filho, Leuven (BE)

(73) Assignees: Hyundai Motor Company, Seoul (KR); Kia Motors Gorporation, Seoul (KR); Katholieke Universiteit Leuven of KU Leuven Research & Development, Leuven (BE)

( * ) Notice: Subject to any disclaimer, the term of this patent is extended or adjusted under 35 U.S.C. 154(b) by 586 days.

(21) Appl. No.: 16/663,847

(22) Filed: Oct. 25, 2019

(65) Prior Publication Data
US 2020/0180523 A1    Jun. 11, 2020

(30) Foreign Application Priority Data
Dec. 7, 2018 (KR) .......................... 10-2018-0157505

(51) Int. Cl.
*B60R 13/08* (2006.01)
*G10K 11/162* (2006.01)

(52) U.S. Cl.
CPC ........ *B60R 13/0884* (2013.01); *G10K 11/162* (2013.01)

(58) Field of Classification Search
CPC .......................... G10K 11/162; B60R 13/0884
See application file for complete search history.

(56) References Cited

U.S. PATENT DOCUMENTS 2,541,159 A * 2/1951 Geiger ...................... E04B 1/84
181/208
4,373,608 A * 2/1983 Holmes ..................... F16F 7/10
181/208
(Continued)

FOREIGN PATENT DOCUMENTS

JP        2006-313502 A    11/2006
KR    10-2013-0021054 A     3/2013
(Continued)

OTHER PUBLICATIONS

Claeys et al., "A lightweight vibro-acoustic metamaterial demonstrator: Numerical and experimental investigation," *Mechanical Systems and Signal Processing*, 70-71, pp. 853-880 (2016).

*Primary Examiner* — Forrest M Phillips
(74) *Attorney, Agent, or Firm* — Morgan, Lewis & Bockius LLP

(57) ABSTRACT

A vibration reduction device having an acoustic meta structure mounted to a vehicle body and configured to block a structure-borne noise transmitted through the vehicle body may include a plurality of unit structures arranged at a predetermined interval therebetween, wherein each of the unit structures includes frame mounted to the vehicle body and configured to separate a predetermined space into a predetermined number of separate sections formed by walls of the frame; and a vibrator formed at a corner portion of each of the separate sections and each of which has a natural frequency to block a vibration transmitted from the vehicle body through the frame.

14 Claims, 8 Drawing Sheets

(56) References Cited

U.S. PATENT DOCUMENTS

| | | | | |
|---|---|---|---|---|
| 8,579,073 | B2* | 11/2013 | Sheng | G10K 11/172 |
| | | | | 181/207 |
| 8,616,330 | B1* | 12/2013 | McKnight | G10K 11/16 |
| | | | | 181/207 |
| 8,869,933 | B1* | 10/2014 | McKnight | G10K 11/172 |
| | | | | 181/207 |
| 9,303,588 | B2* | 4/2016 | Pongratz | F02C 7/24 |
| 10,043,508 | B2* | 8/2018 | Park | G10K 11/04 |
| 10,854,183 | B2* | 12/2020 | Yamazoe | G10K 11/16 |
| 2011/0139542 | A1* | 6/2011 | Borroni | B32B 7/022 |
| | | | | 181/290 |
| 2016/0027427 | A1* | 1/2016 | Yang | G10K 11/172 |
| | | | | 181/286 |
| 2016/0071507 | A1* | 3/2016 | Kim | E04B 1/84 |
| | | | | 181/286 |
| 2019/0120316 | A1 | 4/2019 | Chang et al. | |
| 2019/0333495 | A1* | 10/2019 | Lee | G10K 11/22 |
| 2022/0111805 | A1* | 4/2022 | Kitagawa | B60R 13/0884 |

FOREIGN PATENT DOCUMENTS

| | | |
|---|---|---|
| KR | 10-2013-0021055 A | 3/2013 |
| KR | 10-2019-0045591 A | 5/2019 |
| KR | 10-2019-0053667 A | 5/2019 |

* cited by examiner

VIBRATION REDUCTION DEVICE HAVING ACOUSTIC META STRUCTURE

CROSS-REFERENCE TO RELATED APPLICATION

The present application claims priority to Korean Patent Application No. 10-2018-0157505 filed on Dec. 7, 2018, the entire contents of which is incorporated herein for all purposes by this reference.

BACKGROUND OF THE INVENTION

Field of the Invention

The present invention relates to a vibration reduction device having an acoustic meta structure, and more particularly, a vibration reduction device having an acoustic meta structure for reducing vibration generated from a variety of components of a vehicle and radiated noise caused by the vibration.

Description of Related Art

Generally, a dash panel is mounted between an engine compartment and passenger compartment of a vehicle. A floor panel configuring a bottom surface is mounted toward a rear side of a vehicle body from a lower end of the dash panel.

Particularly, structure-borne noise transmitted through the dash panel and a cowl panel is a very important problem. To overcome such a problem, various efforts such as increasing panel thickness, enlarging curved surface, adding reinforcement members, or applying vibration dampers to reduce or block a noise transmitted from an engine compartment and a road noise transmitted from the ground.

However, to reduce the vibration of a vehicle body by above-mentioned ways, there exist many limitations like increased manufacturing costs and increased vehicle weight.

Accordingly, there is a demand for a new method of reducing noise transmitted into a vehicle from an external source or a variety of components of the vehicle.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vibration reduction device having an acoustic meta structure having advantages of having a plurality of stop band so that vibration and noise is blocked in a wider range.

A vibration reduction device according to an or a plurality of exemplary embodiment of the present invention having an acoustic meta structure mounted to a vehicle body and configured to block a structure-borne noise transmitted through the vehicle body may include a plurality of unit structures arranged at a predetermined interval therebetween, wherein each of the unit structures may include frame mounted to the vehicle body and configured to separate a predetermined space into a predetermined number of separate sections formed by walls of the frame; and a vibrator formed at a corner portion of each of the separate sections and each of which has a natural frequency to block a vibration transmitted from the vehicle body through the frame.

The frame may separate the predetermined space into the predetermined number of four sections, the vibrators may be installed at each of the four sections, and each pair of the vibrators which face each other may have same natural frequency.

The natural frequency may be configured to have same value with a central frequency of a predetermined frequency band.

The vibrator may include a connecting portion configured to have one end which is fixed to the corner portion of each of the separate sections and the other end which is formed as a free end; and a mass portion which is formed at the other end of the connecting portion and configured to vibrate according to the vibration transmitted from the vehicle body through the frame.

The mass portion may be formed in a cylindrical shape having a predetermined thickness, and a portion of lateral surface of the mass portion may be connected with the connecting portion.

As the natural frequency has higher value, a thickness of the connecting portion may become greater, a length of the connecting portion may become less so that a distance between the mass portion and the frame may be reduced, and a radius of the mass portion may become less.

The vibrator may be mounted at a middle of the frame with respect to vertical direction thereof.

Natural frequency of the frame without the vibrators connected may be set to be equal to or greater than twice the natural frequency of the frame with the vibrators connected to the frame.

The frame and the vibrator may be integrally formed of a plastic material.

The predetermined interval of the unit structures may be set to be same with or less than half of a wavelength corresponding to the natural frequency.

According to an exemplary embodiment of the present invention, a vibration reduction device may have multiple range of natural frequency to effectively block a wide range of vibration and noise.

Furthermore, according to an exemplary embodiment of the present invention, a vibration reduction device may be locally applied to a portion of a vehicle body at which vibration or noise is desired to be block, so that the vibration or noise may be blocked effectively while reducing weight of the vehicle body at which the vibration reduction device is applied.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
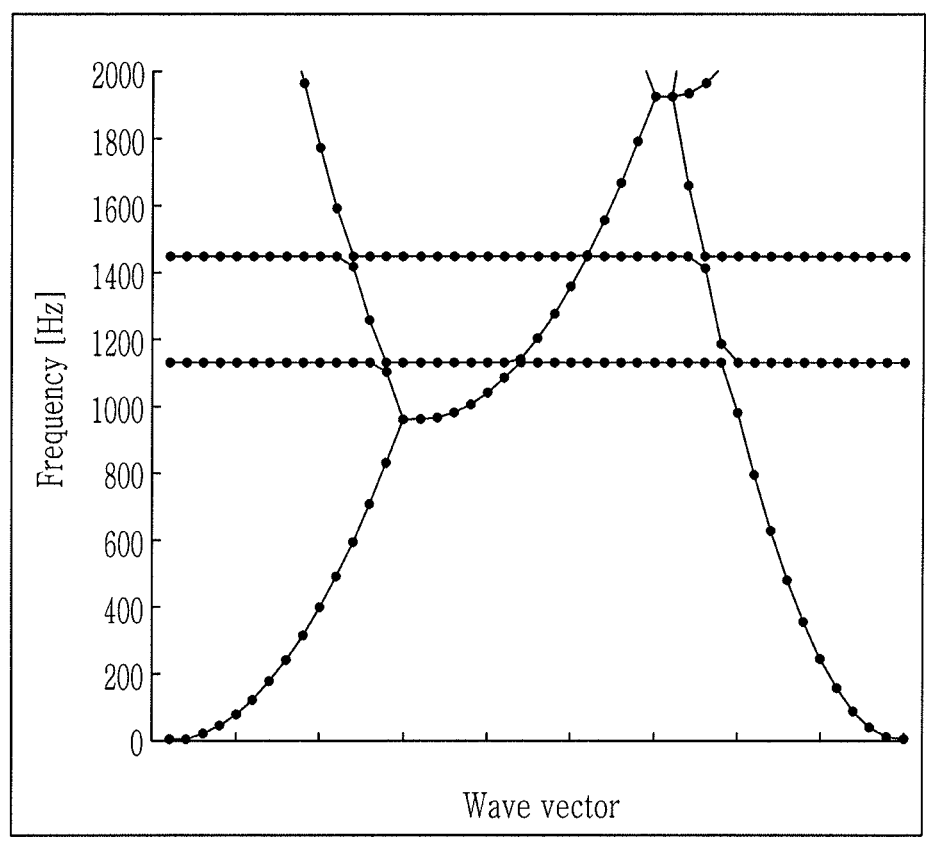
FIG. 1A and FIG. 1B are graphs showing a dispersion relation between wave vector and frequency in a vibration reduction device having an acoustic meta structure according to an exemplary embodiment of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Figure 1B:
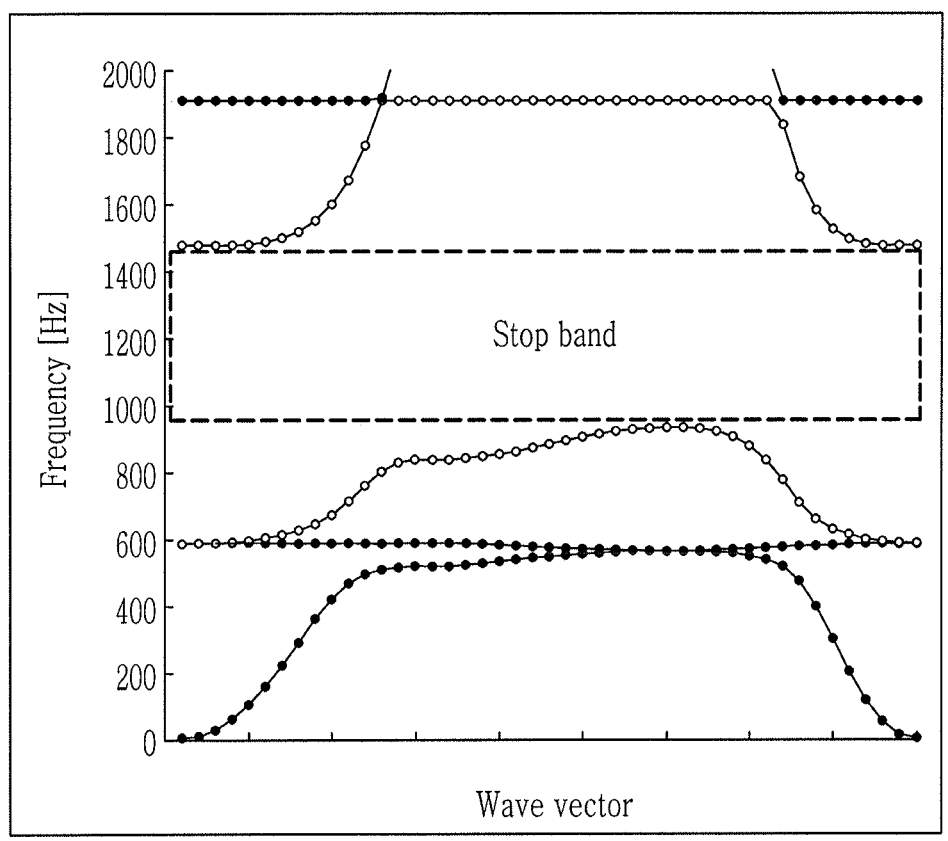
Figure 2:
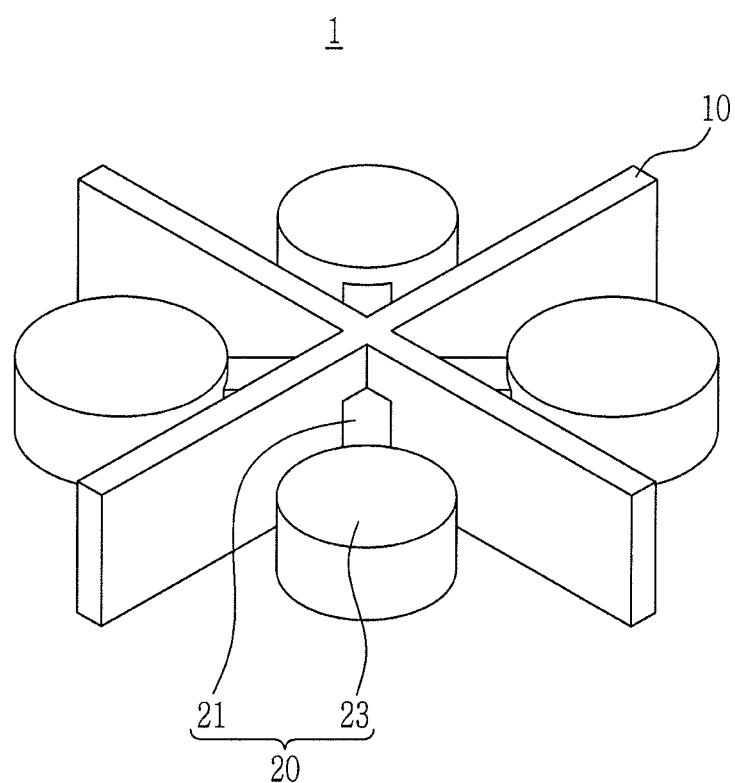
FIG. 2 is a perspective view of a unit structure applied to a vibration reduction device having an acoustic meta structure according to an exemplary embodiment of the present invention.
Figure 3:
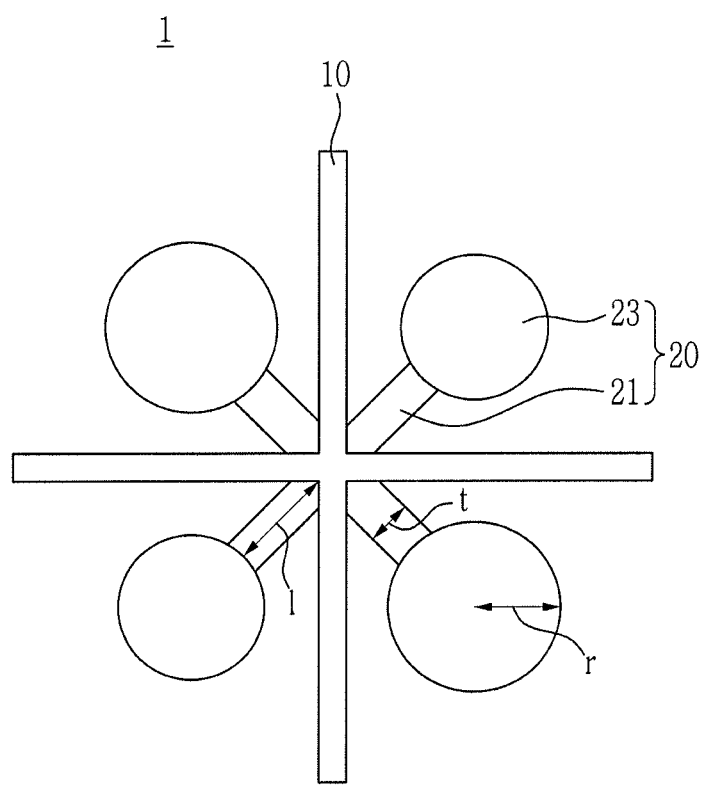
FIG. 3 is a top plan view of a unit structure applied to a vibration reduction device having an acoustic meta structure according to an exemplary embodiment of the present invention.
Figure 4:
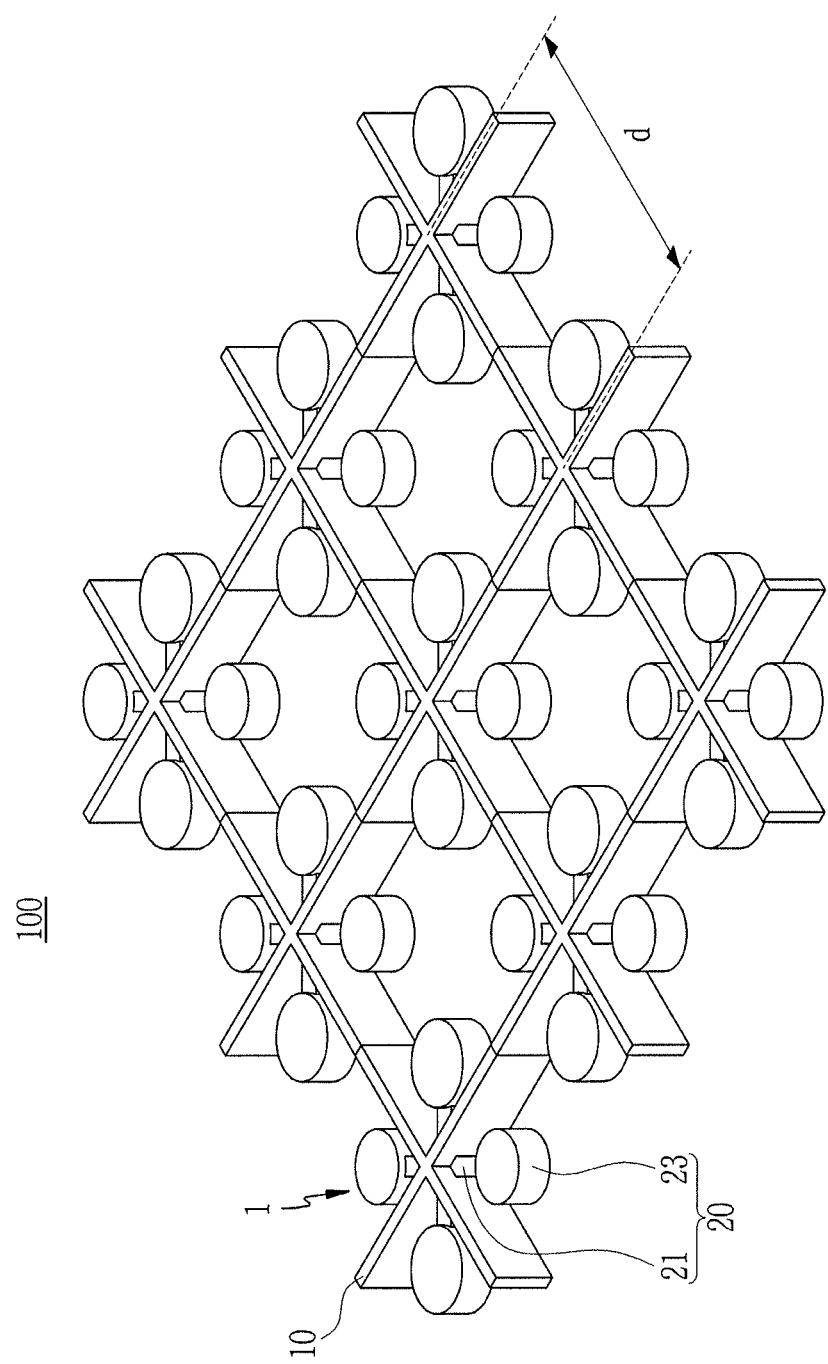
FIG. 4 is a perspective view of a vibration reduction device having an acoustic meta structure according to an exemplary embodiment of the present invention.
Figure 5:
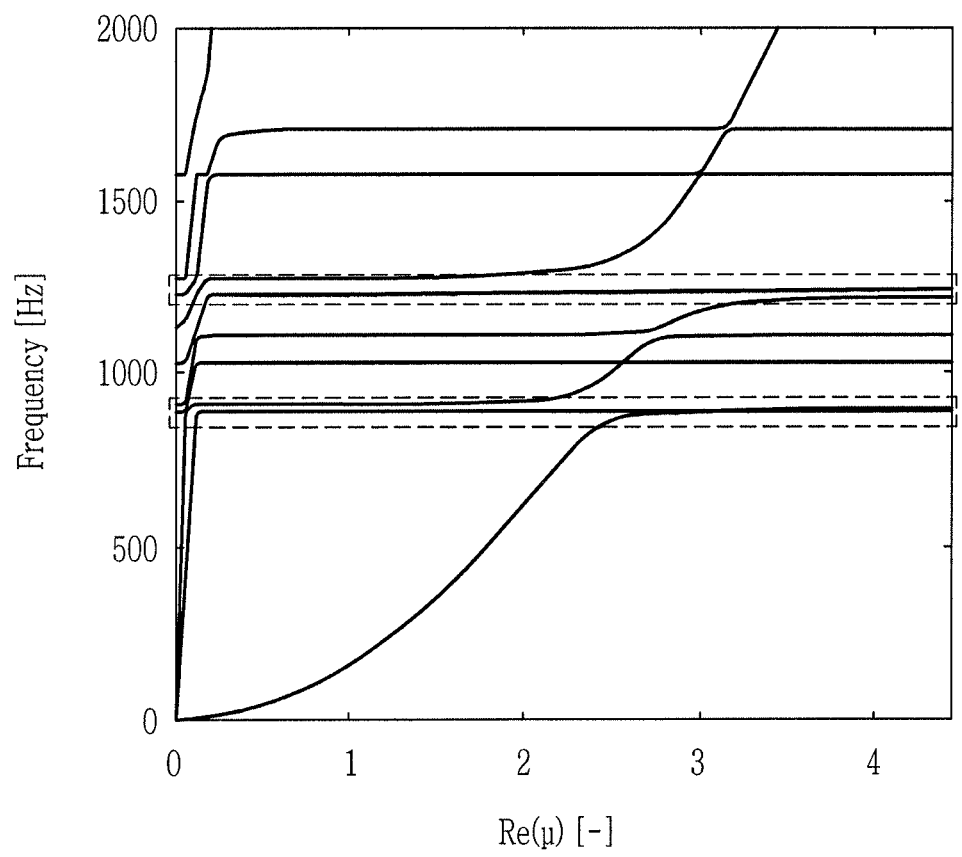
FIG. 5 is a graph showing stop bands in which waves are blocked in a vibration reduction device having an acoustic meta structure according to an exemplary embodiment of the present invention.
Figure 6:
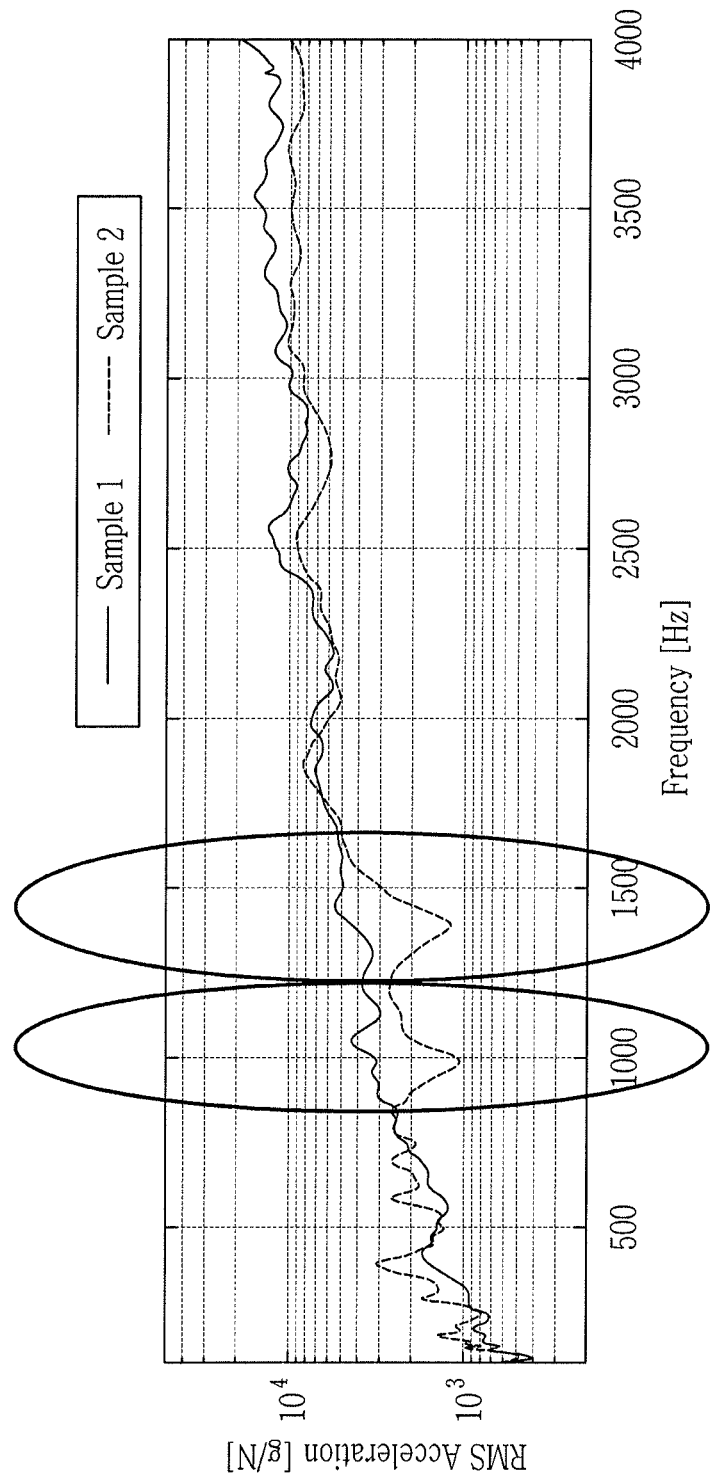
FIG. 6 and FIG. 7 are experiment graphs showing an effect of a vibration reduction device having an acoustic meta structure according to an exemplary embodiment of the present invention.
Figure 7:
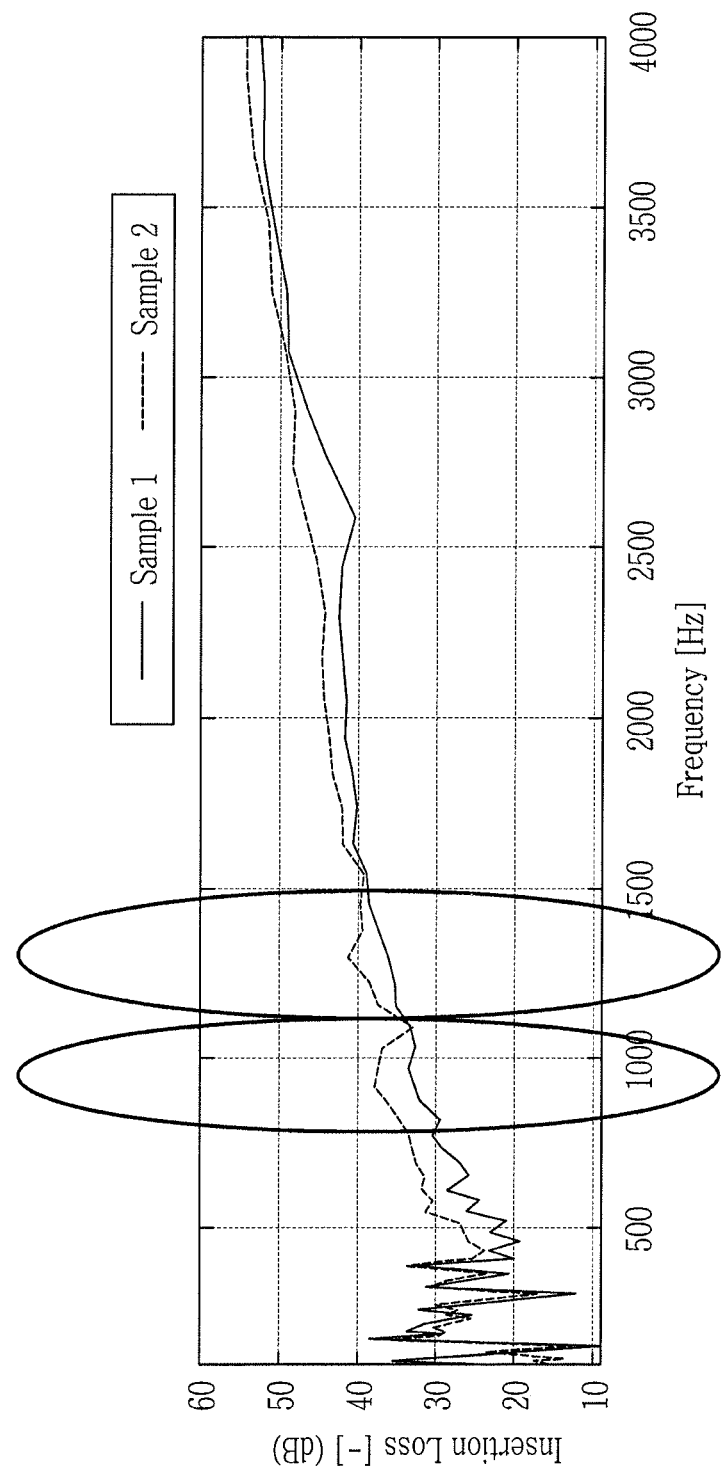

FIGS. 1A and 1B are graphs showing a dispersion relation between wave vector and frequency in a vibration reduction device having an acoustic meta structure according to an exemplary embodiment of the present invention, FIG. 2 is a perspective view of a unit structure applied to a vibration reduction device having an acoustic meta structure according to an exemplary embodiment of the present invention, FIG. 3 is a top plan view of a unit structure applied to a vibration reduction device having an acoustic meta structure according to an exemplary embodiment of the present invention, FIG. 4 is a perspective view of a vibration reduction device having an acoustic meta structure according to an exemplary embodiment of the present invention, FIG. 5 is a graph showing stop bands in which waves are blocked in a vibration reduction device having an acoustic meta structure according to an exemplary embodiment of the present invention, and FIG. 6 and FIG. 7 are experiment graphs showing an effect of a vibration reduction device having an acoustic meta structure according to an exemplary embodiment of the present invention.

A vibration reduction device according to an exemplary embodiment of the present invention may be selectively applied to various panels of a vehicle such as a dash panel, a cowl, a cowl top panel or a roof panel to block noises transmitted through those panels like a structure-borne noise or an air-borne noise.

Furthermore, the vibration reduction device according to an exemplary embodiment of the present invention may be applied to an internal panel or support of an electronic product such as a washing machine, a refrigerator, a dish washer, a microwave, an air conditioner, or a hot blast heater and may reduce vibration or noise transmitted from a rotor such as a motor and a compressor.

Furthermore, the vibration reduction device according to an exemplary embodiment of the present invention may be applied to a support or stiffener for supporting a noise barrier of a road or a storm drain of a building and may be applied to a device for performing milling, cutting, extruding, and molding to reduce noise and vibration.

Furthermore, the vibration reduction device according to an exemplary embodiment of the present invention may be applied to a support and a housing of a rotor device such as a pump, a compressor, and a turbine of an electric power station, may be applied to a support of a hard disk of a computer, or may be applied to a computer main body case to reduce vibration/noise transmitted from a cooling fan, and may be applied to various electronic devices to reduce noise and vibration generated from the devices.

Prior to the detailed description of a vibration reduction device having an acoustic meta structure according to an exemplary embodiment of the present invention, the vibration reduction device having the acoustic meta structure has a characteristic of an acoustic meta material.

Here, the acoustic meta material means a material having a structure artificially designed to have an unique wave characteristic which can't be found naturally.

That is, the material having the acoustic meta structure means a medium having a negative effective dynamic mass in at least a certain frequency range.

In the material having the acoustic meta structure, some specific frequency range in which wave vector corresponding a specific frequency is empty is occurred because of local resonance effect. Such frequency range is called "stop band" and the present frequency range occurs due to the local resonance effects.

Theoretically, at the stop band, propagating waves at the specific frequency do not exist, so that the wave at the specific frequency may be blocked perfectly.

Referring to FIGS. 1A and 1B, a characteristic of wave transmitted through the acoustic meta structure is analyzed through dispersion relation, which is a relationship between wave vector and frequency.

As shown in FIG. 1A, in dispersion relation of usual plane structure, wave vector corresponding to each frequency exists for entire frequency range. That is, wave may be transmitted for entire frequency band.

On the other hand, as shown in FIG. 1B, in dispersion relation of usual plane structure, some specific frequency range in which wave vector corresponding a specific frequency is empty is occurred because of local resonance effect.

A vibration reduction device 100 having an acoustic meta structure is designed based on the stop bands of the acoustic meta structure, as shown in FIG. 4.

In other words, a vibration reduction device 100 having an acoustic meta structure according to an exemplary embodiment of the present invention consists of a periodically arranged unit structures having a locally vibrating structure, so that it may have a stop band characteristic by blocking vibration energy in specific frequency and therefore blocking wave corresponding the specific frequency.

Referring to FIG. 2, a unit structure 1 applied to a vibration reduction device 100 having an acoustic meta structure includes a frame 10 and a vibrator 20.

First, the frame 10 is directly attached to the vehicle body.

Here, the frame 10 may be attached to the vehicle body by using adhesive material or adhesive pad.

Such a frame 10 may be formed in a cross shape.

In other words, the frame may have four sections connected with each other and the walls may be radially disposed based on a center point.

For example, the walls may be connected at the center point and may be radially disposed with an angular interval of 90°.

The frame 10 separates a predetermined space into a predetermined number of separate sections formed by walls of the frame 10.

For example, frame is formed to separate the predetermined space into the predetermined number of four sections.

Furthermore, the vibrator 20 is formed at a corner portion of each of the section.

That is, the vibrator 20 is formed corresponding to the four sections separated by the frame 10.

The vibrator 20 is disposed at a middle of the frame 10 with respect to vertical direction thereof.

The vibrator 20 is configured to vibrate vertically according to an input vibration. Therefore, the frame 10 is preferably designed to have relatively great height to receive the vibration range of the vibrator 20.

Such vibrator 20 consists of a connecting portion 21 and a mass portion 23.

One end of the connecting portion 21 is formed to be corresponding to shape of the corner portion, to be fixed to the corner portion.

Furthermore, the other end of the connecting portion 21 is formed as a free end. Furthermore, the other end is formed to be corresponding to lateral surface of the mass portion 23, which will be described below.

That is, the connecting portion 21 has one end having an angular edge, and the other end having a concave curved profile.

A portion of lateral surface of the mass portion is connected with the other end of the connecting portion 21, so that it may vibrate according to vibration transmitted through the connecting portion 21.

The mass portion 23 is formed in a cylindrical shape having a predetermined thickness.

Size and design of a connecting portion 21 and a mass portion 23 vary according to the natural frequency.

Referring to FIG. 3, a frame may separate a predetermined space into four walls, and vibrators 20 may be installed at each of the four sections. Each of the four vibrators 20 consists of the connecting portion 21 and the mass portion 23.

Each pair of the vibrators 20 which are facing each other are configured to have same natural frequency with the each other. Two pairs of the vibrators 20 have different natural frequencies from each other pair's natural frequencies.

That is, the entire vibrators 20 may have two types of stop bands.

At the present time, a natural frequency may be set to be equal to a central frequency of a predetermined frequency band Furthermore, as the natural frequency of the vibrator needs to be designed to a higher frequency, a length (f) of the connecting portion 21 of the vibrator 20 becomes less so that a distance between the mass portion and the frame is reduced.

Furthermore, as the natural frequency needs to be higher, a thickness (t) of the connecting portion 21 of the vibrator 20 becomes greater.

Furthermore, as the natural frequency needs to be higher, a radius (r) of the mass portion 23 becomes smaller.

Here, "the natural frequency of the vibrator" indicates the frequency, at which the vibrational response of the vibrator is highest upon equal excitation of the base across all frequencies.

A method for designing an above-described unit structure 1 will be described below, with a case in which the unit structure 1 is to be attached to a dash panel of a vehicle.

Usually, importance of vibration reduction on a dash panel of a vehicle is relatively high.

That is, the unit structure 1 is attached to the dash panel for blocking vibration or sound transmitted through the dash panel.

First, a structural acoustic test may be performed on the dash panel to detect a position where the vibration is most generated, and to detect a frequency of a transmission sound corresponding to the position. The detected frequency is set as a target frequency.

Here, in the structural acoustic test, a noise is radiated from a noise source near the engine, and vibration generated on the dash panel accordingly is detected by a laser vibrometer sensor. Through this, it is possible to grasp the vibration aspect when an initial vibration generated by the engine is transmitted to a dash panel.

Next, a frame 10 and a vibrator 20 of the unit structure 1 is designed according to the target frequency, and the design result is analyzed by a dispersion equation of the following Equation 1 for grasping a corresponding stop band.

$$[K_R(k) - \omega^2 M_R(k)] w_R = 0 \qquad \text{[Equation 1]}$$

Here, $K_R$ represents stiffness matrix depending on the position vector R of a unit cell, $M_R$ represents Mass matrix depending on the position vector R of the unit cell, k represents a wave vector, ω represents frequency, and $w_R$ represents a wave vector depending on the position vector R of the unit cell.

As such, the corresponding stop band is compared to the target frequency band. When the corresponding stop band is different from the target frequency band, the detailed design values must be modified. On the other hand, when the corresponding stop band is substantially identical with the target frequency band, the design process is finished.

Referring to FIG. 4, a vibration reduction device 100 consists of a plurality of above described unit structure.

The vibration reduction device 100 is an assembly of plurality of unit structures 1 arranged in a predetermined pattern. In other words, the plurality of unit structures 1 are regularly arranged at a predetermined interval. The interval between the unit structures 1 indicates the distance between a center portion of a frame of a unit structure 1 and a center portion of a frame of a unit structure nearby.

At the present time, the predetermined interval between the unit structures 1 is set to be equal to or less than half of a wavelength corresponding to the natural frequency of noise to be blocked.

Also, as the number of the unit structures 1 included in the vibration reduction device 100 becomes greater, the bandwidth and the amount of blocked noise may become greater.

FIG. 5 is an experimental graph showing measurement of stop band of a unit structure 1 designed to be corresponding to a target frequency. The target frequency band is determined through a structural acoustic test, in which, a position of dash panel where the vibration is most generated is detected, and a problem frequency of the position is detected. As the problem frequencies are detected to be around 900 Hz and 1250 Hz, the target frequencies are set as 900 Hz and 1250 Hz.

In the experiment, a vibration reduction device 100 consisting of the unit structures 1 formed by above-described process is attached to the dash panel, and stop band of the dash panel is measured. In the measurement result, stop bands appeared at two frequency bands of 800-1150 Hz, and 1150-1300 Hz, which corresponds to the above-described target frequencies.

That is, it may be confirmed that the vibration reduction device has two of natural frequency bands.

FIG. 6 is an experimental graph showing a vibration transfer function measured by comparing a case of sample 1, in which sound absorbing material is attached to dash panel, and a case sample 2, in which a vibration reduction device 100 is disposed between the dash panel and the sound absorbing material.

Here, in the case of sample 2, thickness of sound absorbing material is decreased to 1.0t from thickness of sound absorbing material as 1.5t in the case of sample 1, so that the entire weight may be reduced.

Referring to FIG. 6, at the two of the stop bands including two of the target frequencies, which are band of 800-1150 Hz and band of 1150-1500 Hz, the vibration is reduced 5-6 dB more in case of sample 2 compared to sample 1.

That is, by applying the vibration reduction device 100, the vibration and the entire weight of the vehicle body may be reduced simultaneously.

FIG. 7 is a graph showing an experimental result of obtaining an insertion loss which is a kind of acoustic transfer function, by measuring an excitation of a speaker and a response of a microphone in an anechoic chamber.

Referring to FIG. 7, at entire frequency range, vibration reduction effect is improved in case of sample 2 compared to sample 1. More particularly, at the two of the stop bands including two of the target frequencies, which are band of 800-1150 Hz and band of 1150-1500 Hz, the vibration is reduced 3-4 dB more in case of sample 2 compared to sample 1.

As described above, the vibration reduction device 100 having an acoustic meta structure is designed to interrupt structure-borne noise, and has an advantage of reducing vibration of the dash panel and the noise radiated from the dash panel simultaneously.

Accordingly, a vibration reduction device having an acoustic meta structure according to an exemplary embodiment of the present invention may be designed to have two natural frequencies, so that the vibration and noise may be blocked effectively.

Furthermore, by applying a vibration reduction device having an acoustic meta structure according to an exemplary embodiment of the present invention, a sound absorbing material or a sound insulation material may be deleted or their thickness may be reduced, so that the number of parts and the weight may be reduced.

Furthermore, a vibration reduction device having an acoustic meta structure according to an exemplary embodiment of the present invention, may be locally applied to a portion of a vehicle body at which vibration or noise is desired to be blocked, so that the vibration or noise may be blocked effectively while reducing weight of the vehicle body at which the vibration reduction device is applied.

While the present invention has been described in connection with what is presently considered to be practical exemplary embodiments of the present invention, it is to be understood that the present invention is not limited to the disclosed exemplary embodiments of the present invention, but, on the contrary, is intended to cover various modifications and equivalent claims as well as various alternatives and modifications thereof. It is intended that the scope of the present invention be defined by the Claims appended hereto and their equivalents."

[1] Claeys, C. C., Vergote, K., Sas, P., & Desmet, W. (2013). On the potential of tuned resonators to obtain low-frequency vibrational stop bands in periodic panels. Journal of Sound and Vibration, 332(6), 1418-1436.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vibration reduction device having an acoustic meta structure configured to be mounted to a vehicle body and to block a structure-borne noise transmitted through the vehicle body, the vibration reduction device comprising:
  at least a unit structure,
  wherein each of the at least one unit structure includes:
    a frame configured to be mounted to the vehicle body and to separate a predetermined space into a predetermined number of separate sections formed by walls of the frame; and
    a vibrator formed at a corner portion of each of the separate sections and having a natural frequency to block a vibration transmitted from the vehicle body through the frame,
  wherein the frame is formed to separate the predetermined space into the predetermined number of four sections formed by four walls of the frame,
  wherein the vibrators are installed at each of the four sections, such that each vibrator is dedicated to a corresponding corner portion without being correlated to other corner portions, and wherein each pair of the vibrators which face each other has same natural frequency.

2. The vibration reduction device of claim 1, wherein the four walls are connected at a center point of the frame and radially disposed from the center point with an angular interval of 90° in a cross shape.

3. The vibration reduction device of claim 1, wherein each of the vibrators include:

a connecting portion including a first end portion which is fixed to a corner portion of adjacent walls among the four walls and a second end portion which is formed as a free end; and a mass portion which is formed at the second end portion of the connecting portion and configured to vibrate according to the vibration transmitted from the vehicle body through the frame.

4. The vibration reduction device of claim 3, wherein the mass portion is formed in a cylindrical shape having a predetermined thickness, and wherein a portion of lateral surface of the mass portion is connected to the connecting portion.

5. The vibration reduction device of claim 3, wherein, as the natural frequency becomes higher, the connecting portion is formed to have a thickness which becomes greater, the connecting portion is formed to have a length which becomes less so that a distance between the mass portion and the frame is reduced, and the mass portion is formed to have a radius that becomes less.

6. The vibration reduction device of claim 1, wherein the natural frequency is configured to have same value with a central frequency of a predetermined frequency band.

7. The vibration reduction device of claim 1, wherein each of the vibrators include:

a connecting portion having a first end portion which is fixed to a corner portion of adjacent walls among the walls and a second end portion which is formed as a free end; and a mass portion which is formed at the second end portion of the connecting portion and configured to vibrate according to the vibration transmitted from the vehicle body through the frame.

8. The vibration reduction device of claim 7, wherein the mass portion is formed in a cylindrical shape having a predetermined thickness, and wherein a portion of lateral surface of the mass portion is connected to the connecting portion.

9. The vibration reduction device of claim 7, wherein, as the natural frequency becomes higher, the connecting portion is formed to have a thickness which becomes greater, the connecting portion is formed to have a length which becomes less so that a distance between the mass portion and the frame is reduced, and the mass portion is formed to have a radius that becomes less.

10. The vibration reduction device of claim 1, wherein the vibrator is disposed at a middle of the frame with respect to a vertical direction thereof.

11. The vibration reduction device of claim 1, wherein natural frequency of the frame without vibrators is set to be equal to or greater than twice natural frequency of the frame with the vibrators connected to the frame.

12. The vibration reduction device of claim 1, wherein the frame and the vibrator are integrally formed of a plastic material.

13. The vibration reduction device of claim 1, wherein the at least one unit structure includes at least two unit structures arranged at a predetermined interval therebetween.

14. The vibration reduction device of claim 13, wherein the predetermined interval of the at least two unit structures is set to be equal to or less than half of a wavelength corresponding to the natural frequency.

* * * * *